United States Patent
Jung et al.

(10) Patent No.: US 9,646,363 B2
(45) Date of Patent: May 9, 2017

(54) IMAGE PROCESSING APPARATUS AND METHOD FOR DETECTING OBJECT USING EQUI-HEIGHT MOSAICKING IMAGE, AND VEHICLE OPERATION ASSISTING SYSTEM EMPLOYING SAME

(71) Applicant: Kyungpook National University Industry-Academic Cooperation Foundation, Daegu (KR)

(72) Inventors: Soon Ki Jung, Daegu (KR); Min Woo Park, Gyeongsangnam-do (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 200 days.

(21) Appl. No.: 14/474,457

(22) Filed: Sep. 2, 2014

(65) Prior Publication Data

US 2015/0248753 A1    Sep. 3, 2015

(30) Foreign Application Priority Data

Feb. 28, 2014  (KR) .................. 10-2014-0024505

(51) Int. Cl.
   *G06K 9/00* (2006.01)
   *G06T 3/40* (2006.01)
   *G06T 7/73* (2017.01)

(52) U.S. Cl.
   CPC .............. *G06T 3/4038* (2013.01); *G06T 7/73* (2017.01); *G06T 2207/30252* (2013.01)

(58) Field of Classification Search
   CPC ......... G06T 2207/30252; G06T 3/4038; G06T 7/004
   See application file for complete search history.

(56) References Cited

U.S. PATENT DOCUMENTS

| 8,289,392 | B2 | 10/2012 | Senior et al. | |
|---|---|---|---|---|
| 2012/0133780 | A1* | 5/2012 | Zhang | G06T 7/0018 348/187 |
| 2012/0269456 | A1* | 10/2012 | Bekaert | G06T 3/4038 382/284 |
| 2013/0083971 | A1* | 4/2013 | Du | G06K 9/00825 382/104 |

FOREIGN PATENT DOCUMENTS

| JP | 2010274534 A | 12/2010 |
|---|---|---|
| KR | 10-1243294 B1 | 3/2013 |
| KR | 10-2013-0058286 A | 6/2013 |

(Continued)

OTHER PUBLICATIONS

Chan et al., "A study on the adaptive ROI extracting algorithm for pedestrian detection", 2013, pp. 53-54.

(Continued)

*Primary Examiner* — Nirav G Patel
(74) *Attorney, Agent, or Firm* — Carter, DeLuca, Farrell & Schmidt, LLP

(57) ABSTRACT

Provided is an image processing device including: an area extraction unit extracting areas corresponding to size of a predetermined target object from an image; a mosaicking image creation unit connecting extracted areas to create a mosaicking image; and an object detection unit detecting an object from the mosaicking image.

19 Claims, 12 Drawing Sheets

(56) References Cited

FOREIGN PATENT DOCUMENTS

KR       10-1371875 A     6/2013
WO     2012164804 A1    12/2012

OTHER PUBLICATIONS

Zehang Sun, George Bebis and Ronald Miller, On-Road Vehicle Detection Using Gabor Filters and Support Vector Machines, Digital Signal Processing, 2002. DSP 2002. 2002 14th International Conference on Digital Signal Processing Proceedings DSP (vol. 2).

* cited by examiner

US 9,646,363 B2

IMAGE PROCESSING APPARATUS AND METHOD FOR DETECTING OBJECT USING EQUI-HEIGHT MOSAICKING IMAGE, AND VEHICLE OPERATION ASSISTING SYSTEM EMPLOYING SAME

CROSS-REFERENCE TO RELATED APPLICATIONS

This U.S. non-provisional patent application claims priority under 35 U.S.C. §119 of Korean Patent Application No. 10-2014-0024505, filed on Feb. 28, 2014, the entire contents of which are hereby incorporated by reference.

BACKGROUND OF THE INVENTION

The present invention disclosed herein relates to an image processing device and method, and a vehicle operation assisting system employing the same.

A technology to process an image captured by a camera and detect an object is being utilized in various fields. As an example, a vehicle operation assisting system that senses an obstacle placed near a vehicle during a vehicle operation and provides related information to a driver may use an object detection technology as a method of sensing an obstacle.

Since the vehicle operation assisting system should immediately provide information on a nearby obstacle to a driver during a vehicle operation, it needs quick image processing.

In general, an image obtained by capturing views around a vehicle, such as a view before a vehicle has a certain size and includes many obstacles including the vehicles and pedestrians. In this case, a process of processing the image and detecting objects corresponding to obstacles from a corresponding image needs a significantly long time.

SUMMARY OF THE INVENTION

The present invention provides an image processing device and method that may decrease necessary calculations when detecting an object from an image and shorten a processing time, and a vehicle operation assisting system employing the same.

Embodiments of the present invention provide image processing devices including: an area extraction unit extracting areas corresponding to size of a predetermined target object from an image; a mosaicking image creation unit connecting extracted areas to create a mosaicking image; and an object detection unit detecting an object from the mosaicking image.

In some embodiments, the area extraction unit may include: a vanishing point detection unit detecting a vanishing point from the image; an area height calculation unit designating horizontal lines at preset intervals vertically from the vanishing point on the image, and calculating an area height corresponding to height of the target object on each horizontal line; and an area cutting unit cutting an area corresponding to the area height off from each horizontal line.

In other embodiments, the area extraction unit may further include a bird's eye view image conversion unit converting the image into a bird's eye view image, and the area height calculation unit designates bird's eye view horizontal lines at preset intervals on the bird's eye view image, and designates horizontal lines on the image by converting coordinates on the bird's eye view image for the bird's eye view horizontal lines into coordinates on the image.

In still other embodiments, the area height may be proportional to distance between a corresponding horizontal line and the vanishing point.

In even other embodiments, the mosaicking image creation unit may adjust heights of the extracted areas to be the same, and horizontally connect height-adjusted areas to create the mosaicking image.

In yet other embodiments, the object detection unit may horizontally detect the object on the mosaicking image.

In further embodiments, the image processing device may further include an image calibration unit that calibrates at least one of lens distortion and skew on the image before extracting the areas from the image.

In other embodiments of the present invention, image processing methods include: extracting areas corresponding to size of a predetermined target object from an image; connecting extracted areas to create a mosaicking image; and detecting an object from the mosaicking image.

In some embodiments, the extracting of the areas may include: detecting a vanishing point from the image; designating horizontal lines at preset intervals vertically from the vanishing point on the image; calculating an area height corresponding to height of the target object on each horizontal line; and cutting an area corresponding to the area height off from each horizontal line.

In other embodiments, the designating of the horizontal lines may include: converting the image into a bird's eye view image; designating bird's eye view horizontal lines at preset intervals on the bird's eye view image; and converting coordinates on the bird's eye view image for the bird's eye view horizontal lines into coordinates on the image.

In still other embodiments, the area height may be proportional to distance between a corresponding horizontal line and the vanishing point.

In even other embodiments, the creating of the mosaicking image may include: adjusting heights of the extracted areas to be the same; and horizontally connecting height-adjusted areas.

In yet other embodiments, the detecting of the object may include horizontally detecting the object on the mosaicking image.

In further embodiments, the image processing method may further include calibrating at least one of lens distortion and skew on the image before extracting the areas.

In still other embodiments of the present invention, vehicle operation assisting systems include: a camera capturing views around a vehicle; an image processing device processing an image captured by the camera to detect a thing around the vehicle; and an output unit outputting information on a detected thing, wherein the image processing device includes: an area extraction unit extracting areas corresponding to size of a predetermined target object from an image; a mosaicking image creation unit connecting extracted areas to create a mosaicking image; and an object detection unit detecting an object corresponding to the thing from the mosaicking image.

In some embodiments, the area extraction unit may include: a vanishing point detection unit detecting a vanishing point from the image; an area height calculation unit designating horizontal lines at preset intervals vertically from the vanishing point on the image, and calculating an area height corresponding to height of the target object on each horizontal line; and an area cutting unit cutting an area corresponding to the area height off from each horizontal line.

In other embodiments, the area extraction unit may further include a bird's eye view image conversion unit converting the image into a bird's eye view image, and the area height calculation unit designates bird's eye view horizontal lines at preset intervals on the bird's eye view image, and designates horizontal lines on the image by converting coordinates on the bird's eye view image for the bird's eye view horizontal lines into coordinates on the image.

In still other embodiments, the area height may be proportional to distance between a corresponding horizontal line and the vanishing point.

In even other embodiments, the mosaicking image creation unit may adjust heights of the extracted areas to be the same and horizontally connects height-adjusted areas to create the mosaicking image.

In yet other embodiments, the object detection unit may horizontally detect the object on the mosaicking image.

In further embodiments, the image processing device may further include an image calibration unit that calibrates at least one of lens distortion and skew on the image before extracting the areas from the image.

In even other embodiments of the present invention, the image processing method may be implemented in a program that may be executed by a computer, and may be recorded in a computer readable recording medium.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Other advantages and features of the present invention, and implementation methods thereof will be clarified through following embodiments described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to a person skilled in the art. Further, the present invention is only defined by scopes of claims.

Even if not defined, all the terms used herein (including technology or science terms) have the same meanings as those generally accepted by typical technologies in the related art to which the present invention pertains. The terms defined in general dictionaries may be construed as having the same meanings as those used in the related art and/or the present disclosure and even when some terms are not clearly defined, they should not be construed as being conceptual or excessively formal.

The terms used herein are only for explaining embodiments while not limiting the present invention. The terms of a singular form may also include plural forms unless otherwise specified. The terms used herein "includes", "comprises", "including" and/or "comprising" do not exclude the presence or addition of one or more compositions, ingredients, components, steps, operations and/or elements other than the compositions, ingredients, components, steps, operations and/or elements that are mentioned. In the present disclosure, the term "and/or" indicates each of enumerated components or various combinations thereof.

The term "unit", "device", "block", or "module" used herein may mean a unit for processing at least one function or operation. For example, it may mean software or a hardware component such as FPGA or ASIC. However, the term "unit", "device", "block" or "module" is not limited to the software or the hardware. The term "unit", "device", "block" or "module" may be configured in an addressable storage medium or may be configured to operate one or more processors.

Thus, as an example, the "unit", "device", "block" or "module" includes components such as software components, object-oriented software components, class components, and task components; processes, functions, attributes, procedures, sub routines, program code segments, drivers, firmware, micro codes, circuits, data, DBs, data structures, tables, arrays and variables. Components and functions provided in the "unit", "device", "block" or "module" may be integrated to be a smaller number of components and a smaller number of units, blocks, or modules or may be further divided into further components and further units, groups, or modules.

Various embodiments of the present invention are described below in detail with reference to the accompanying drawings.

Figure 1:
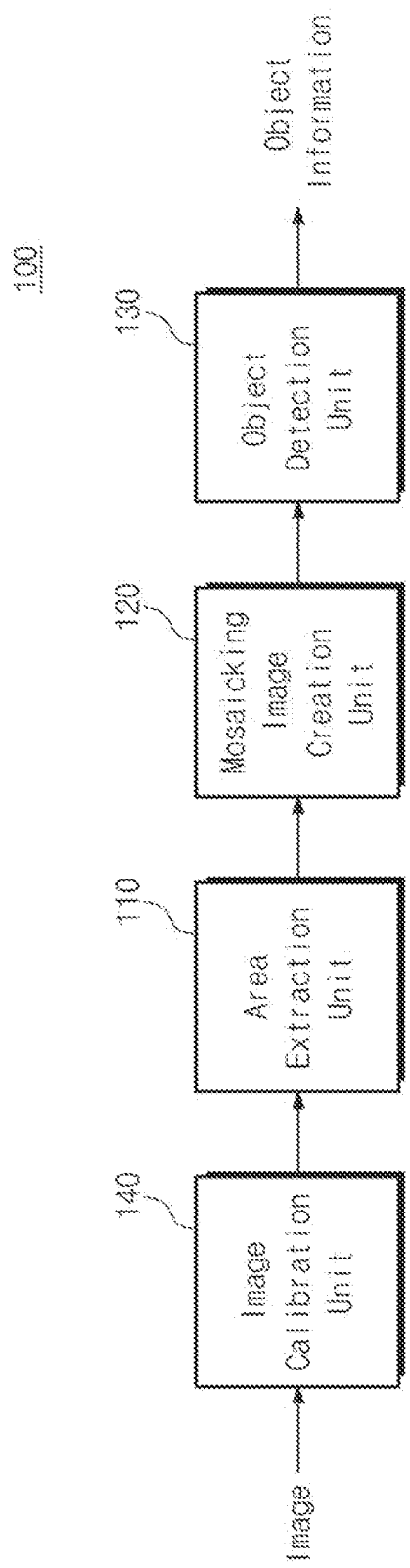
FIG. 1 is an exemplary block diagram of an image processing device according to an embodiment of the present invention.

FIG. 1 is an exemplary block diagram of an image processing device 100 according to an embodiment of the present invention.

As shown in FIG. 1, the image processing device 100 may include an area extraction unit 110, a mosaicking image creation unit 120, and an object detection unit 130.

The image processing device 100 according to an embodiment of the present invention is a device that obtains and processes an image and detects an object included in the image, and may include a processor such as a GPU or a CPU. The processor may call and execute an image processing program stored in a storage device, and obtain information on an object included in an image.

According to another embodiment of the present invention, the area extraction unit 110 may extract areas corresponding to size of a predetermined target object from an image.

Figure 2:
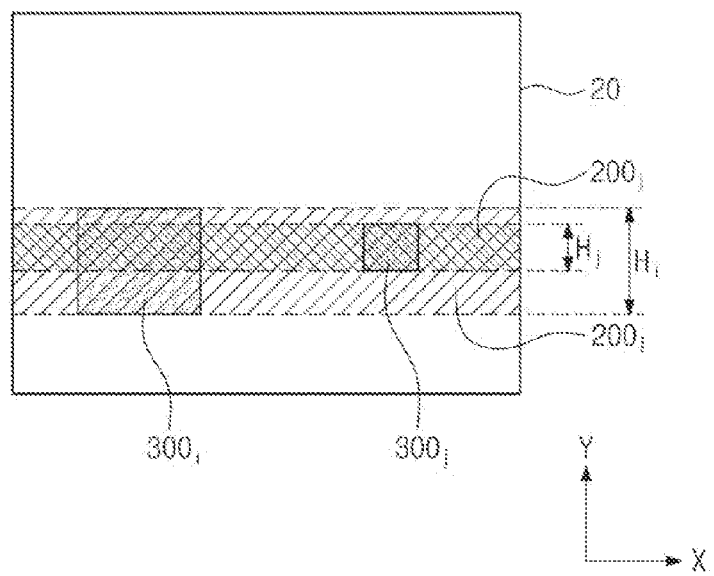
FIG. 2 is an exemplary diagram for explaining a process of extracting areas from an image according to an embodiment of the present invention.

FIG. 2 is an exemplary diagram for explaining a process of extracting areas from an image 20 according to an embodiment of the present invention.

Referring to FIG. 2, the area extraction unit 110 may extract areas $200_i$ and $200_j$ from the image 20. According to an embodiment of the present invention, the areas $200_i$ and $200_j$ may correspond to the size of a target object to be detected through image processing.

For example, as shown in FIG. 2, the heights $H_i$ and $H_j$ of the areas $200_i$ and $200_j$ may be the same as those of target objects $300_i$ and $300_j$ to be detected, respectively. As such, the area extraction unit 110 may extract the areas $200_i$ and $200_j$ corresponding to the heights of the target objects $300_i$ and $300_j$ from the image 20.

According to an embodiment of the present invention, the mosaicking image creation unit 120 may connect the extracted areas $200_i$ and $200_j$ to create a mosaicking image.

The mosaicking image used in the present disclosure means an image that is crated by connecting a plurality of unit images in a certain direction.

Figure 3:
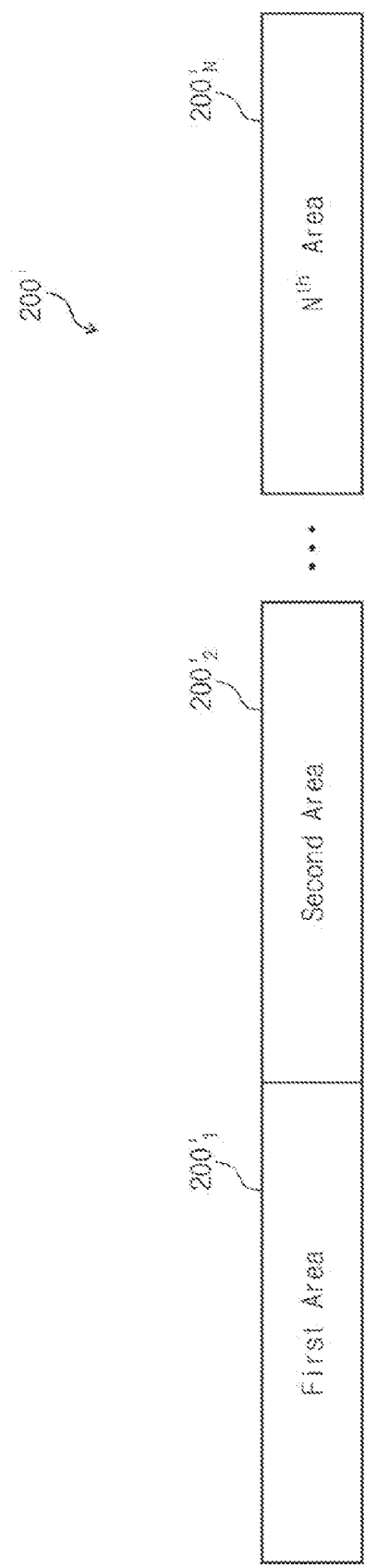
FIG. 3 is an exemplary diagram for explaining a process of connecting extracted areas according to an embodiment of the present invention.

FIG. 3 is an exemplary diagram for explaining a process of connecting extracted areas according to an embodiment of the present invention.

The mosaicking image creation unit 120 may connect areas $200_1'$ to $200_N'$ extracted from the image 20 to create a mosaicking image 200'. As shown in FIG. 3, when the areas $200_1'$ to $200_N'$ are horizontally connected, the mosaicking image 200' may be formed as a horizontally elongated panorama image.

As a result, the mosaicking image 200' has a height corresponding to that of the target object $300_i$ and $300_j$ to be detected through image processing and has a length corresponding to a value obtained by the product of the length of the image 20 and the number N of the areas.

According to an embodiment of the present invention, the object detection unit 130 may detect an object from the mosaicking image 200'.

Figure 4:
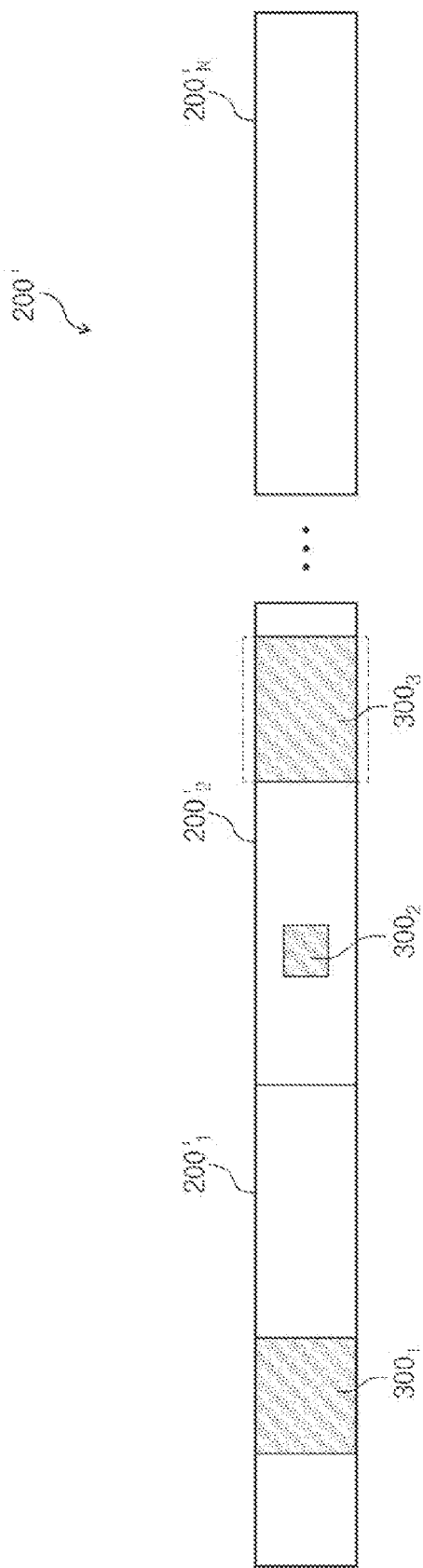
FIG. 4 is an exemplary diagram for explaining a process of detecting an object from a mosaicking image according to an embodiment of the present invention.

FIG. 4 is an exemplary diagram for explaining a process of detecting an object from the mosaicking image 200' according to an embodiment of the present invention.

Referring to FIG. 4, the object detection unit 130 may detect an object from the mosaicking image 200'. As described previously, since the mosaicking image 200' has an area height corresponding to the size of a target object to be detected, such as a height of the target object, the object detection unit 130 may detect an object from the mosaicking image 200' in the length direction of the image.

In other words, since the object detection unit 130 does not need to perform an object detection process in the height direction of the mosaicking image 200', it is possible to detect an object by performing a 1D object search only.

Since the height of the mosaicking image 200' corresponds to that of a target object to be detected, the object detection unit 130 may detect a corresponding object when the height of an object is the same as that of the mosaicking image 200' as in the case of a first object 3001 of FIG. 4.

However, when in FIG. 4, the height of an object is different from that of the mosaicking image 200' as in the cases of a second object 3002 and a third object 3003, the object detection unit 130 fails to detect a corresponding object.

According to an embodiment of the present invention, the area extraction unit 110 may include a vanishing point detection unit, an area height calculation unit, and an area cutting unit.

The vanishing point detection unit may detect a vanishing point from an image. The area height calculation unit may designate horizontal lines at preset intervals vertically from the vanishing point on the image and calculate an area height corresponding to the height of a target object on each horizontal line. The area cutting unit may cut an area corresponding to the area height off from each horizontal line.

Figure 5:
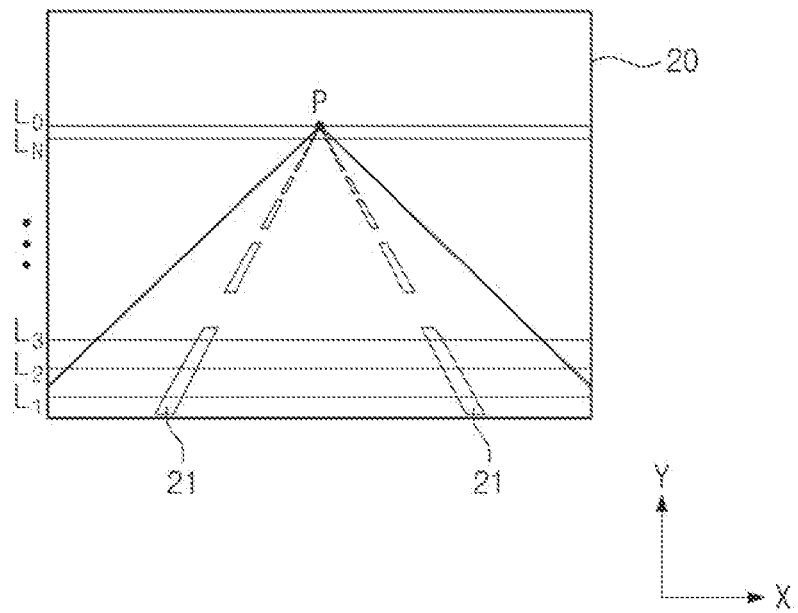
FIG. 5 is an exemplary diagram for explaining a process of designating a horizontal line on an image according to an embodiment of the present invention.

FIG. 5 is an exemplary diagram for explaining a process of designating a horizontal line on the image 20 according to an embodiment of the present invention.

Firstly, in order to extract areas corresponding to the size of a target object from the image 20, the vanishing point detection unit may detect a vanishing point P of the image 20.

According to an embodiment, the vanishing point detection unit may use lines included in the image 20 to detect the vanishing point P.

The image 20 shown in FIG. 5 is an image obtained by capturing a view before a vehicle while the vehicle runs, and the image 20 may include a plurality of lines including a lane 21.

The vanishing point detection unit may detect only a line corresponding to the lane 21 among the plurality of lines and detect the vanishing point P of the image 20 based on the detection.

In addition, a horizontal line L0 passing through the vanishing point P on the image 20 may be considered to be the horizon.

Then, the area height calculation unit may designate horizontal lines $L_1$ to $L_N$ on the image 20 at preset intervals vertically (i.e., in a direction parallel to the y-axis of FIG. 5) from the vanishing point P.

Since the horizontal lines $L_1$ to $L_N$ are points where it is expected that an object to be detected is placed, the area height calculation unit may designate horizontal lines $L_1$ to $L_N$ only under the horizon L0 at preset intervals.

According to an embodiment, the horizontal lines $L_1$ to $L_N$ may be designated on the image 20 at the same interval but may also be designated at different intervals.

Near the horizon L0, the size of an object on the image 20 will decrease, and when a user wants to detect an object corresponding to a vehicle or a pedestrian from the image, an obstacle close to the vehicle may be more precisely detected and an obstacle distant from the vehicle may be less precisely detected.

In this case, the horizontal lines $L_1$ to $L_N$ may be designated at different intervals according to distance from the lower end of the image 20 or the horizon L0 corresponding to a capturing point by a camera.

In order to designate the horizontal lines $L_1$ to $L_N$ on the image, the area height calculation unit may also use a bird's eye view image of the image 20.

According to the embodiment, the area extraction unit 110 may further include a bird's eye view image conversion unit that converts the image 20 into a bird's eye view image.

In addition, the area height calculation unit may designate bird's eye view horizontal lines at preset intervals on the bird's eye view image, and designate horizontal lines $L_1$ to $L_N$ on the image 20 by converting coordinates on the bird's eye view image for the bird's eye view horizontal lines into coordinates on the image 20.

Figure 6:
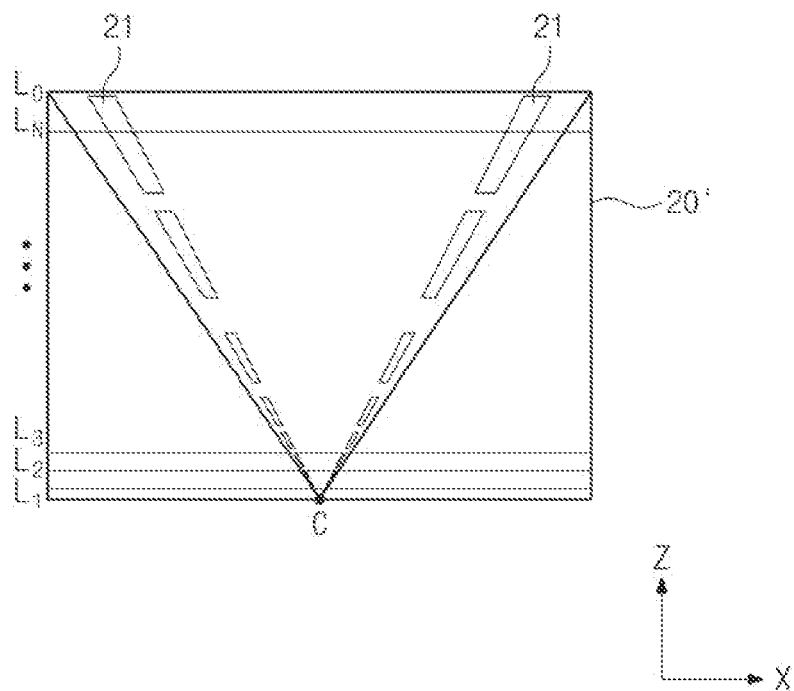
FIG. 6 is an exemplary diagram for explaining a process of designating a horizontal line on an image by using a bird's eye view image according to another embodiment of the present invention.

FIG. 6 is an exemplary diagram for explaining a process of designating a horizontal line on the image 20 by using the bird's eye view image 20' according to another embodiment of the present invention.

As shown in FIG. 6, the bird's eye view image conversion unit may convert the image 20 designating the horizontal lines $L_1$ to $L_N$ into the bird's eye view image 20'.

The image 20 corresponding to the original represents an image obtained by projecting an object onto a coordinate plane including an x-axis and a y-axis, while the bird's eye view image 20' represents an image obtained by projecting an object onto a coordinate plane including an x-axis and a z-axis. In this example, the x-axis is a coordinate axis parallel to the ground and corresponding to the radial direction of a lens, the y-axis is a coordinate axis perpendicular to the ground, and the z-axis is a coordinate axis parallel to the ground and parallel to the central axis of the lens.

In addition, as shown in FIG. 6, the area height calculation unit may designate bird's eye view horizontal lines $L_1'$ to $L_N'$ at preset intervals on the bird's eye view image 20.

According to an embodiment, the bird's eye view horizontal lines $L_1'$ to $L_N'$ may be designated at the same interval on the bird's eye view image 20' without limitation and the intervals between the bird's eye view horizontal lines may also be differently set.

For example, as shown in FIG. 6, the bird's eye view horizontal lines $L_1'$ to $L_N'$ may be designated so that an interval may widen from the point C captured by a camera toward the horizon L0'.

As a result, it is possible to improve image processing efficiency by more precisely detecting an object close to a camera and by less precisely detecting an object distant from the camera.

Then, the area height calculation unit may convert coordinates on the bird's eye view image 20' for the bird's eye view horizontal lines $L_1'$ to $L_N'$ into coordinates on the image 20 being the original and thus designate horizontal lines $L_1$ to $L_N$ on the image 20.

In addition, the area height calculation unit may calculate an area height corresponding to the height of a target object to be detected on each horizontal line.

Figure 7:
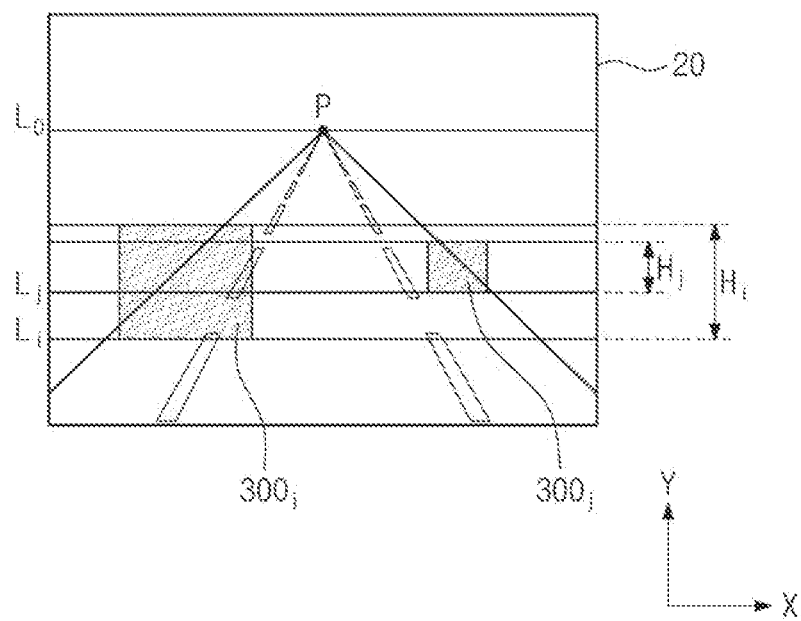
FIG. 7 is an exemplary diagram for explaining a process of calculating area heights corresponding to the heights of target objects on horizontal lines according to an embodiment of the present invention.

FIG. 7 is an exemplary diagram for explaining a process of calculating area heights $H_i$ and $H_j$ corresponding to the heights of target objects $300_i$ and $300_j$ on the horizontal lines $L_i$ and $L_j$ according to an embodiment of the present invention.

According to the application field of the image processing device 100 according to an embodiment of the present invention, a target object to be detected by the image processing device 100 may be specified. For example, when a vehicle operation assisting system that senses obstacles around a vehicle, such as another vehicle or a pedestrian, and provides related information to a driver is implemented by employing the image processing device 100, the target object may be the vehicle or the pedestrian.

As an example, when the vehicle is the target object, the area height calculation unit may calculate an area height corresponding to the actual height of the vehicle on each of horizontal lines $L_1$ to $L_N$.

In the image 20 of FIG. 7, the sizes of target objects $300_i$ and $300_j$ on the image 20 may be different depending on distance from a camera even if the sizes of vehicles are the same. For example, even if the sizes of the vehicles are the same, the size of an object corresponding to a vehicle adjacent to the camera will be large and on the contrary, the size of an object corresponding to a vehicle distant from the camera will be small.

According to an embodiment of the present invention, it is possible to calculate area heights $H_i$ and $H_j$ corresponding to those of target objects on each of horizontal lines $L_1$ to $L_N$ and in this case, it is possible to calculate so that the area heights are proportional to distances between corresponding horizontal lines and the vanishing point P.

For example, referring to FIG. 7, the area height $H_i$ for the horizontal line $L_i$ more distant from the vanishing point P among the horizontal lines $L_i$ and $L_j$ designated on the image 20 may be larger than the area height $H_j$ for the horizontal line $L_j$ closer to the vanishing point P.

The calculation of the area heights $H_i$ and $H_j$ may be performed by previously capturing an object corresponding to a target object. That is, by previously capturing the object, it is possible to obtain the height $R_H$ of the target object on an image and the distance $R_D$ between the vanishing point P and the lower end of the target object on the image and calculate an area height H on each horizontal line by using Equation 1 below:

$$H = \frac{R_H}{R_D} \times D, \qquad \langle \text{Equation 1} \rangle$$

where D means distance between a corresponding horizontal line and the vanishing point P.

Through the above-described processes, the area height calculation unit may calculate area heights corresponding to the heights of target objects $300_i$ and $300_j$ on each of horizontal lines $L_1$ to $L_N$.

Then, the area cutting unit may cut an area corresponding to the area height off from each of horizontal lines $L_1$ to $L_N$.

Figure 8:
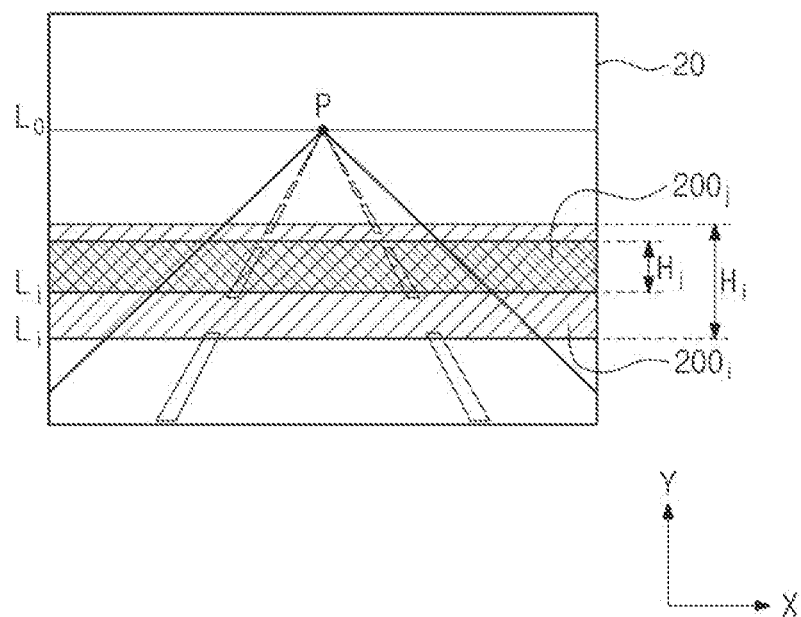
FIG. 8 is an exemplary diagram for explaining a process of extracting areas corresponding to the size of a target object from an image according to an embodiment of the present invention.

FIG. 8 is an exemplary diagram for explaining a process of extracting areas $200_i$ and $200_j$ corresponding to the size of a target object from the image 20 according to an embodiment of the present invention.

As described previously, when an area height corresponding to the height of a target object for each of horizontal lines $L_1$ to $L_N$ on the image 20 is calculated, the area cutting unit may cut an area corresponding to that area height off from each of horizontal lines $L_1$ to $L_N$.

For example, as shown in FIG. 8, since an area height for the horizontal line $L_i$ is $H_i$ and an area height for the horizontal line $L_j$ is $H_j$, the area cutting unit may cut an area $200_i$ corresponding to the area height $H_i$ off from the horizontal line $L_j$ and cut an area $200_j$ corresponding to the area height $H_j$ off from the horizontal line $L_j$.

Then, the mosaicking image creation unit 120 may connect cut areas to create a mosaicking image 200'.

According to an embodiment of the present invention, the mosaicking image creation unit 120 adjusts the heights of the cut areas and then may horizontally connect height-adjusted areas to create the mosaicking image 200'.

Figure 9:
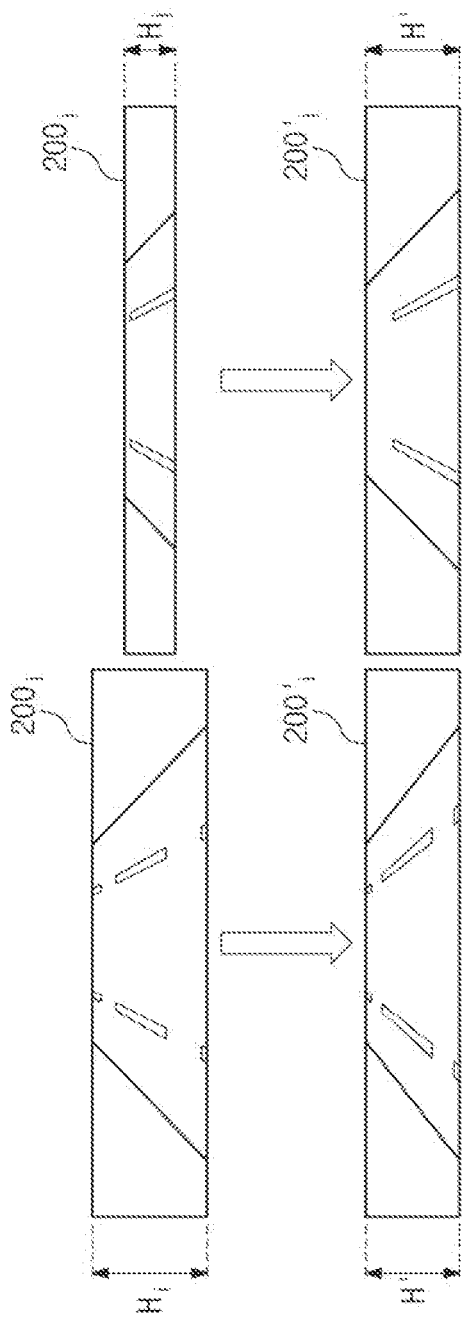
FIG. 9 is an exemplary diagram for explaining a process of adjusting the height of extracted areas according to an embodiment of the present invention.

FIG. 9 is an exemplary diagram for explaining a process of adjusting the heights Hi and $H_j$ of extracted areas according to an embodiment of the present invention.

As shown in FIG. 9, the mosaicking image creation unit 120 may adjust both the heights Hi and $H_j$ of the extracted areas $200_i$ and $200_j$ to H'. Then, the mosaicking image creation unit 120 may horizontally connect height-adjusted areas $200_i'$ and $200_j'$ to create the mosaicking image 200' as shown in FIG. 3.

Then, the object detection unit 130 may detect an object from the mosaicking image 200'.

As described with reference to FIG. 4, the object detection unit 130 may horizontally detect an object from the mosaicking image 200'.

According to an embodiment of the present invention, the object detection unit 130 may use a histogram of oriented gradient (HOG) to 1-dimensionally detect an object from the mosaicking image 200'.

According to an embodiment of the present invention, the object detection unit 130 may detect an object with less calculation, searching for an object in a length direction without a need to scale an image for object detection.

Furthermore, since the mosaicking image 200' is a single image extended in a length direction corresponding to the number of areas, the object detection unit 130 may perform image processing by calling a function for object detection only once and thus it is possible to achieve an increase in image processing speed due to a decrease in number of times that a function is called.

Referring back to FIG. 1, the image processing device 100 may further include an image calibration unit that calibrates at least one of lens distortion and skew on the image 20 before extracting areas from the image 20.

Figure 10:
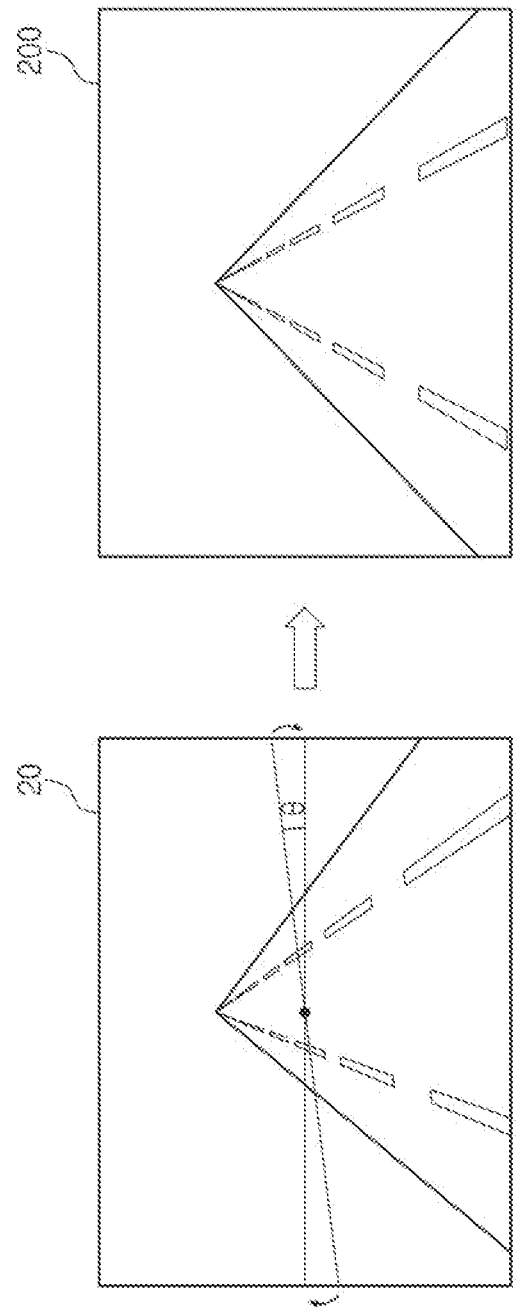
FIG. 10 is an exemplary diagram for explaining a process of calibrating the skew of an image according to an embodiment of the present invention.

FIG. 10 is an exemplary diagram for explaining a process of calibrating the skew of the image according to an embodiment of the present invention.

An image output from a camera may include lens distortion and skew due to camera lens and camera installation related limitations. For example, as shown in FIG. 10, an initial image output from the camera may include skew corresponding to θ due to oblique camera installation.

The image calibration unit may calibrate at least one of lens distortion and skew on the image 20 before extracting areas from the image 20.

In particular, as described previously, when extracting areas based on the locations of the vanishing point P and the horizon L0, it is possible to increase the reliability of an object detection result by performing image calibration before the extraction of areas.

Figure 11:
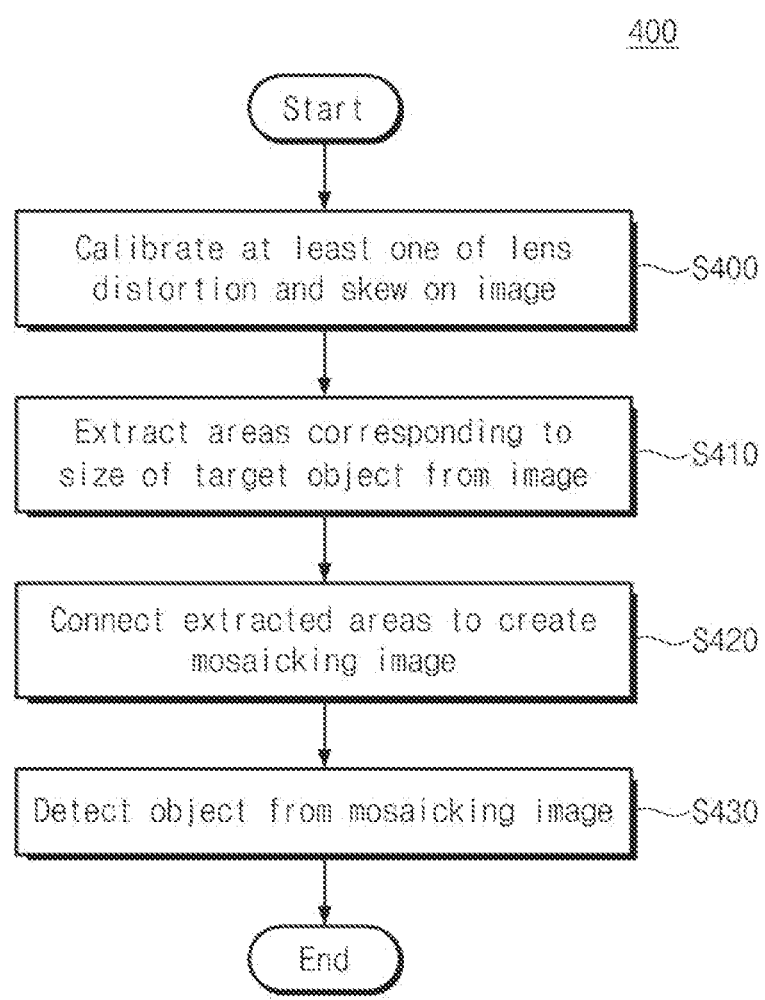
FIG. 11 is an exemplary flow chart of an image processing method according to an embodiment of the present invention.

FIG. 11 is an exemplary flow chart of an image processing method 400 according to an embodiment of the present invention.

The image processing method 400 may be performed by the image processing device 100 according to an embodiment of the present invention as described previously.

As shown in FIG. 11, the image processing method 400 may include extracting areas corresponding to size of a predetermined target object from the image 20 in step S410, connecting extracted areas to create the mosaicking image 200 in step S420, and detecting the object from the mosaicking image 200' in step S430.

Figure 12:
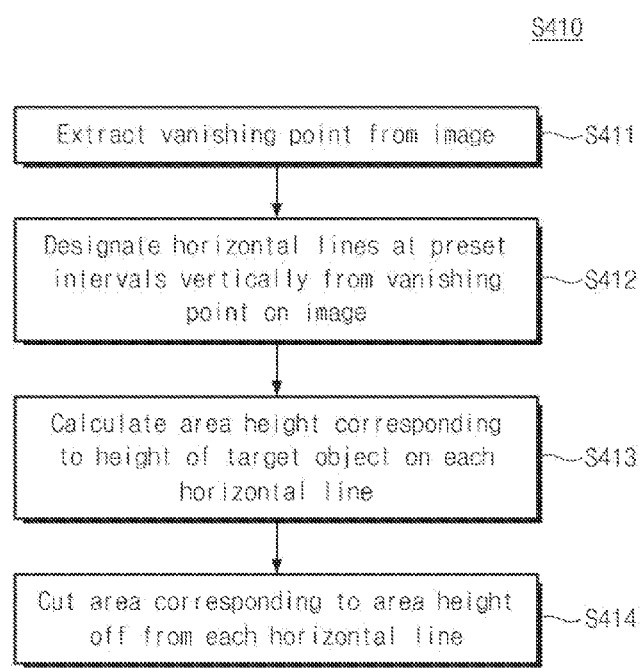
FIG. 12 is an exemplary flow chart for explaining a process of extracting areas from an image according to an embodiment of the present invention.

FIG. 12 is an exemplary flow chart for explaining a process S410 of extracting areas from an image according to an embodiment of the present invention.

As shown in FIG. 12, the extracting of the areas in step S410 may include detecting the vanishing point P from the image 20 in step S411, designating the horizontal lines $L_1$ to $L_N$ at preset intervals vertically from the vanishing point P on the image 20 in step S412, calculating an area height H corresponding to the height of the target object on each horizontal line in step S413, and cutting an area corresponding to the area height H off from each horizontal line in step S414.

Figure 13:
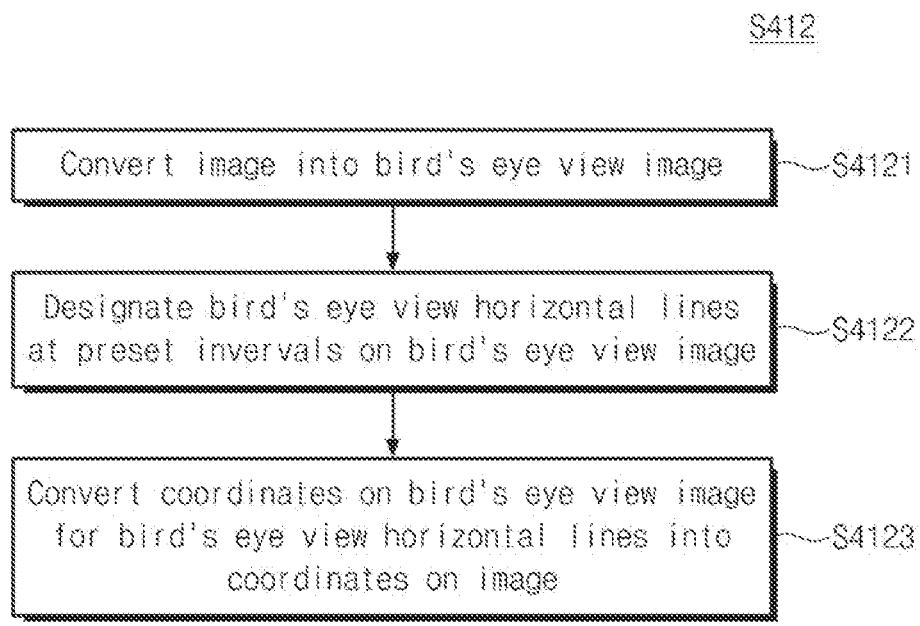
FIG. 13 is an exemplary flow chart for explaining a process of designating a horizontal line on an image according to an embodiment of the present invention.

FIG. 13 is an exemplary flow chart for explaining a process S412 of designating horizontal lines $L_1$ to $L_N$ on the image 20 according to an embodiment of the present invention.

As shown in FIG. 13, the designating of the horizontal lines $L_1$ to $L_N$ in step S412 may include converting the image into the bird's eye view image 20' in step S4121, designating the bird's eye view horizontal lines $L_1'$ to $L_N'$ at preset intervals on the bird's eye view image 20' in step S4122, and converting coordinates on the bird's eye view image 20' for the bird's eye view horizontal lines $L_1'$ to $L_N'$, into coordinates on the image 20 in step S4123.

According to an embodiment, the area height H may be proportional to distance between a corresponding horizontal line and the vanishing point P. For example, the area height H on each horizontal line may be calculated by using Equation 1.

Figure 14:
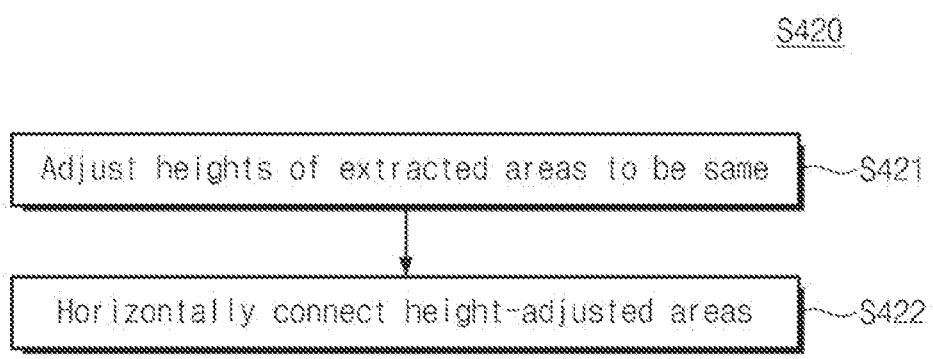
FIG. 14 is an exemplary flow chart for explaining a process of creating a mosaicking image according to an embodiment of the present invention.

FIG. 14 is an exemplary flow chart for explaining a process S420 of creating the mosaicking image' according to an embodiment of the present invention.

As shown in FIG. 14, step S420 of creating the mosaicking image 200' may include step S421 of adjusting the heights of extracted areas so that they are the same, and step S422 of horizontally connecting height-adjusted areas.

Then, step S430 of detecting the object may include horizontally detecting an object on the mosaicking image 200'.

Referring back to FIG. 11, the image processing device 400 may further include step S400 of calibrating at least one of lens distortion and skew on the image 20 before step S410 of extracting areas.

Figure 15:
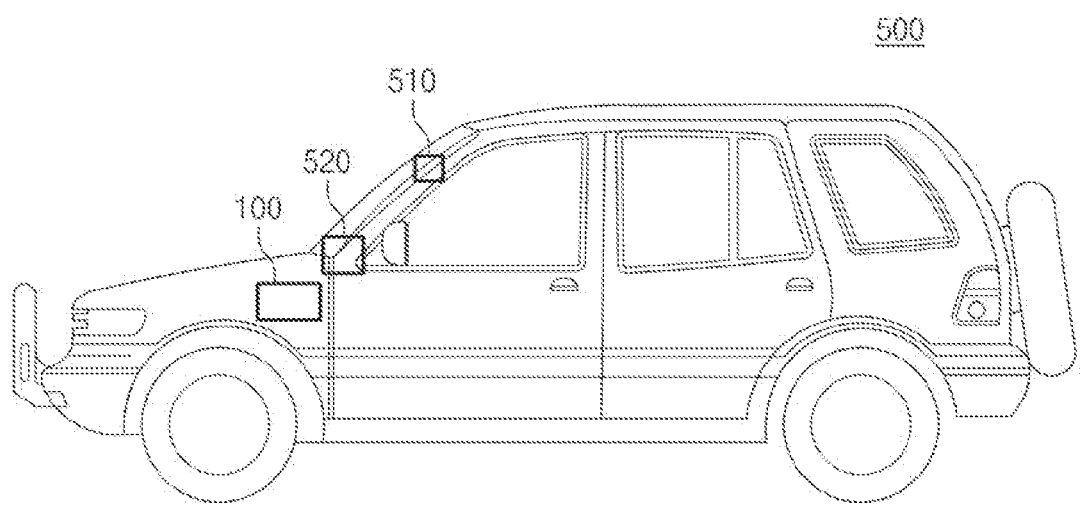
FIG. 15 is a schematic block diagram of a vehicle operation assisting system according to an embodiment of the present invention.

FIG. 15 is a schematic block diagram of a vehicle operation assisting system 500 according to an embodiment of the present invention.

Referring to FIG. 15, the vehicle operation assisting system 500 according to an embodiment of the present invention may include a camera 510, an image processing device 100 and an output unit 520.

The camera 510 may be installed at a vehicle and capture views around the vehicle. For example, the camera 510 may be installed on the room mirror of the vehicle and capture views before the vehicle.

Images output from the camera 510 may be provided to the image processing device 100. The image processing device 100 may also be installed at the vehicle and include a processor for image processing and a storage device.

The image processing device 100 corresponds to the image processing device 100 according to an embodiment of the present invention as described above and may perform the above-described image processing method 400 to detect objects around a vehicle, such as another vehicle and a pedestrian.

The output unit 520 may display information on a detected object and provide the information to a user, such as a driver or persons who are in the vehicle.

According to an embodiment, the output unit 520 may be a projector that projects an image of a detected object onto the front glass of a vehicle but the output unit 520 is not limited thereto as long as information on an object is provided to a user. As an example, the output unit 520 may also provide information on an object as voice or vibration instead of an image to a user.

As a result, the vehicle operation assisting system 500 may sense an obstacle obstructing an operation, provide a notice of the presence of the obstacle to a user, and also be applied to a system for collision avoidance while running in some embodiments.

According to an embodiment of the present invention, by extracting areas corresponding to size of a predetermined target object from an image, creating a mosaicking image and detecting an object therefrom, it is possible to enhance an image processing speed by decreasing calculation needed for object detection and reducing the number of times that a function for object detection is called.

According to an embodiment of the present invention, it is possible to decrease calculation needed for object detection.

According to an embodiment of the present invention, it is possible to shorten an image processing time by calling a function for object detection only once per image.

Although the present invention is described above through embodiments, the embodiments above are only provided to describe the spirit of the present invention. A person skilled in the art will understand that various modifications to the above-described embodiments may be made. The scope of the present invention is defined only by the following claims.

What is claimed is:

1. An image processing device comprising:
   an area extraction unit extracting areas corresponding to a size of a predetermined target object from an image;
   a mosaicking image creation unit connecting the extracted areas to create a mosaicking image; and
   an object detection unit detecting an object on the mosaicking image,
   wherein the area extraction unit comprises:
   a vanishing point detection unit detecting a vanishing point from the image;
   an area height calculation unit designating horizontal lines at preset intervals vertically from the vanishing point on the image, and calculating an area height corresponding to a height of the predetermined target object on each horizontal line; and
   an area cutting unit cutting an area corresponding to the area height off from each horizontal line.

2. The image processing device of claim 1, wherein the area extraction unit further comprises a bird's eye view image conversion unit converting the image into a bird's eye view image, and
   wherein the area height calculation unit designates bird's eye view horizontal lines at preset intervals on the bird's eye view image, and designates horizontal lines on the image by converting coordinates on the bird's eye view image for the bird's eye view horizontal lines into coordinates on the image.

3. The image processing device of claim 1, wherein the area height is proportional to a distance between a corresponding horizontal line and the vanishing point.

4. The image processing device of claim 1, wherein the mosaicking image creation unit adjusts heights of the extracted areas to be the same, and horizontally connects height-adjusted areas to create the mosaicking image.

5. The image processing device of claim 1, wherein the object detection unit horizontally detects the object on the mosaicking image.

6. The image processing device of claim 1, further comprising an image calibration unit that calibrates at least one of lens distortion and skew on the image before extracting the areas from the image.

7. An image processing method comprising:
   extracting areas corresponding to a size of a predetermined target object from an image;
   connecting the extracted areas to create a mosaicking image; and
   detecting an object on the mosaicking image,
   wherein the extracting of the areas comprises:
   detecting a vanishing point from the image;
   designating horizontal lines at preset intervals vertically from the vanishing point on the image;
   calculating an area height corresponding to a height of the predetermined target object on each horizontal line; and
   cutting an area corresponding to the area height off from each horizontal line.

8. The image processing method of claim 7, wherein the designating of the horizontal lines comprises:
   converting the image into a bird's eye view image;
   designating bird's eye view horizontal lines at preset intervals on the bird's eye view image; and
   converting coordinates on the bird's eye view image for the bird's eye view horizontal lines into coordinates on the image.

9. The image processing method of claim 7, wherein the area height is proportional to a distance between a corresponding horizontal line and the vanishing point.

10. The image processing method of claim 7, wherein connecting the extracted areas to create the mosaicking image comprises:
    adjusting heights of the extracted areas to be the same; and
    horizontally connecting height-adjusted areas.

11. The image processing method of claim 7, wherein the detecting of the object comprises horizontally detecting the object on the mosaicking image.

12. The image processing method of claim 7, further comprising:
    calibrating at least one of lens distortion and skew on the image before extracting the areas.

13. A non-transitory computer readable recording medium on which a program to execute the method of claim 7 on a computer is recorded.

14. A vehicle operation assisting system comprising:
    a camera capturing an image around a vehicle;
    an image processing device processing the image captured by the camera to detect a thing around the vehicle; and
    an output unit outputting information on a detected thing,
    wherein the image processing device comprises:
    an area extraction unit extracting areas corresponding to a size of a predetermined target object from an image;
    a mosaicking image creation unit connecting the extracted areas to create a mosaicking image; and
    an object detection unit detecting an object corresponding to the thing on the mosaicking image, wherein the area extraction unit comprises:
a vanishing point detection unit detecting a vanishing point from the image;
an area height calculation unit designating horizontal lines at preset intervals vertically from the vanishing point on the image, and calculating an area height corresponding to a height of the predetermined target object on each horizontal line; and
an area cutting unit cutting an area corresponding to the area height off from each horizontal line.

15. The vehicle operation assisting system of claim 14, wherein the area extraction unit further comprises a bird's eye view image conversion unit converting the image into a bird's eye view image, and
wherein the area height calculation unit designates bird's eye view horizontal lines at preset intervals on the bird's eye view image and designates horizontal lines on the image by converting coordinates on the bird's eye view image for the bird's eye view horizontal lines into coordinates on the image.

16. The vehicle operation assisting system of claim 14, wherein the area height is proportional to a distance between a corresponding horizontal line and the vanishing point.

17. The vehicle operation assisting system of claim 14, wherein the mosaicking image creation unit adjusts heights of the extracted areas to be the same and horizontally connects height-adjusted areas to create the mosaicking image.

18. The vehicle operation assisting system of claim 14, wherein the object detection unit horizontally detects the object on the mosaicking image.

19. The vehicle operation assisting system of claim 14, wherein the image processing device further comprises an image calibration unit that calibrates at least one of lens distortion and skew on the image before extracting the areas from the image.

* * * * *